United States Patent [19]

Tsuyumoto et al.

[11] Patent Number: 5,393,432
[45] Date of Patent: Feb. 28, 1995

[54] SEPARATING MEMBRANE OF POLYION COMPLEX

[75] Inventors: Michio Tsuyumoto; Masahiko Sugimoto, both of Hyogo; Yasushi Maeda, Shizuoka; Hitoshi Tsugaya, Osaka, all of Japan

[73] Assignee: Japan, Ministry of International Trade and Industry Director-General, Tokyo, Japan

[21] Appl. No.: 157,029

[22] PCT Filed: Nov. 26, 1992

[86] PCT No.: PCT/JP92/01547
   § 371 Date: Dec. 1, 1993
   § 102(e) Date: Dec. 1, 1993

[30] Foreign Application Priority Data

Apr. 23, 1992 [JP] Japan .................................. 4-129397

[51] Int. Cl.$^6$ .............................................. B01D 61/36
[52] U.S. Cl. .............................. 210/640; 210/500.37; 210/500.43
[58] Field of Search .................. 210/640, 638, 500.37, 210/500.43

[56] References Cited

U.S. PATENT DOCUMENTS 4,871,461 10/1989 Karakane et al. .
5,032,282 7/1991 Linder et al. .................. 210/651

Primary Examiner—Frank Spear
Attorney, Agent, or Firm—Weingram & Zall

[57] ABSTRACT

To provide a separating membrane of a polyion complex having excellent separation factor, permeation rate and performance stability and being used in separating a mixture of water and an organic substance in accordance with the separating membrane technology. The separating membrane is a novel one comprising a polyion complex which comprises an ionic combination of an anionic polymer having carboxyl groups with a cationic polymer having divalent piperidinium bases. With respect to the separation characteristics of the separating membrane, a permeation rate is at least 100 g/m$^2$·hr and a separation factor is at least 1,000 in an evaluation according to pervaporation (by reducing the pressure outside the hollow fiber while feeding a 99 wt. % aqueous ethanol solution inside the same at 70° C.). Further, a durability evaluation shows that the permeation rate and separation factor of the separating membrane are respectively 110 g/m$^2$·hr and 1,500 after the lapse of one month, attesting to desirable stability.

7 Claims, No Drawings

SEPARATING MEMBRANE OF POLYION COMPLEX

SPECIFICATION

1. Field of Industrial Application

The present invention relates to a permselective membrane for water having a broad spectrum of applications. The permselective membrane for water according to the present invention is useful as those which are used in pervaporation and vapor permeation, and futher is used in reverse osmosis and dehumidification of air utilizing the hydrophilicity of the membrane.

2. Related Art

Reverse osmosis has been put into practical use to concentrate an aqueous solution of an organic substance having a low concentration with a membrane. However, the reverse osmosis is inapplicable to an aqueous solution having a high concentration and hence exhibiting a high osmotic pressure, because a pressure not lower than the osmotic pressure of a fluid fed for separation (namely, fluid to be treated) must be applied to a separating membrane. That is, there is a limit in the concentration of a solution to which the reverse osmosis is applicable. In contrast, pervaporation and vapor permeation are now drawing attention as novel separation methods, because these methods are separation methods which are not affected by osmotic pressure. Pervaporation is a method comprising reducing the pressure or passing a carrier gas on the secondary side (permeate side) of a membrane while feeding a fluid for separation to the primary side of the membrane so as to cause a substance to be separated to permeate the membrane in gaseous form. Vapor permeation is a similar method to the pervaporation, except that a vapor mixture is fed to the primary side of the membrane. A membrane-permeating substance (a substance to be separated) can be collected by cooling vaporous permeate to effect condensation thereof.

With respect to pervaporation, various researches have been reported. For example, one in which a mixture of an organic substance and water was separated using a membrane of a polymer having active anion groups and another one in which a mixture of ethanol and water was separated using a membrane of cellulose acetate or polyvinyl alcohol have been reported. Further, a crosslinked polyvinyl alcohol membrane, a cellulose triacetate membrane and a crosslinked membrane based on a polyethyleneimine have been reported as a separating membrane for use in pervaporation. However, it can be stated that the membranes described in these research reports have such a low permeation rate that their practical value is poor.

On the other hand, a membrane of an anionic polysaccharide or a polysaccharide derivative may be mentioned as a membrane having excellent separating performance. However, the use of such membranes involves latent problems inevitable for natural polymers, such as depolymerization caused by an acid or alkali and bacterial decomposition. Therefore, desirable durability and chemical resistance cannot be expected from these membranes.

A separating membrane of a polyion complex of a carboxylated polymer, such as polyacrylic acid (see, for example, U.S. Pat. No. 4,871,461), may be mentioned as a membrane which is excellent in both permeation rate and separation factor. However, it is difficult to use this separating membrane at high temperatures. For example, when a 99 wt. % aqueous ethanol solution is used as a fluid feed (fluid to be treated), the employment of a temperature as high as 70° C. or above to increase the permeation rate is likely to cause the separation factor to decrease.

The object of the present invention is to provide a membrane exhibiting stable separation factor and permeation rate irrespective of the employment of high temperatures (e.g., 70° C. or above) for a fluid feed.

The term "permeation rate" used in the present invention means the amount of permeation of a substance fed for treatment (fluid or vapor feed) per unit membrane area and per unit time, which is expressed in $kg/m^2 \cdot hr$. On the other hand, the separation factor ($\alpha$) is the ratio of the ratio of water to an organic substance in a gaseous permeate $\{(X/Y)_p\}$ to that of water to an organic substance in a fluid or vaporous feed $\{(X/Y)_f\}$. That is, $\alpha^X{}_Y = (X/Y)_p/(X/Y)_f$. In this formula, X and Y respectively represent proportions (weight fractions) of water and an organic substance of a binary system, and p and f respectively mean permeate side (secondary side of a membrane) and feed side (primary side of a membrane).

Disclosure of the Invention

The present inventors have made extensive studies to resolve the above problems of the conventional membranes. As a result, they have found that a separating membrane having excellent thermal stability is obtained by the use of a polyion complex comprised of an ionic combination of an anionic polymer having carboxyl groups with a cationic polymer having divalent piperidine rings, as a membranous material.

Thus, the present invention provides a separating membrane of a polyion complex characterized in that, in the membranous structure, at least, at least part of the primary side surface of the membrane comprises an ionic combination of an anionic polymer having carboxyl groups with a cationic polymer having divalent piperidine rings.

Accordingly, the present invention comprehends a separating membrane of a polyion complex characterized in that, in the membranous structure, at least the surface of the membrane comprises an ionic combination of an anionic polymer having carboxyl groups with a cationic polymer having divalent piperidine rings.

The cationic polymer having divalent piperidine rings is preferably a cationic polymer having divalent piperidinium bases represented by the following general formulae (I) or (II):

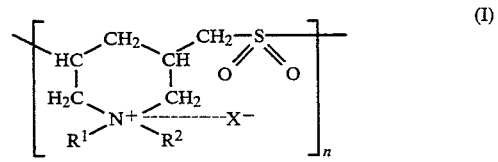

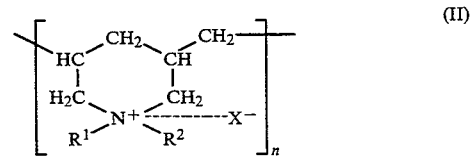

wherein each of $R^1$ and $R^2$ represents a hydrogen atom or a linear or branched, saturated or unsaturated, alphabetic hydrocarbon group (provided that at least one hydrogen atom of the hydrocarbon group may be substituted with a hydroxyl group, a halogen atom or an aromatic hydrocarbon group), X⁻ represents a halide counter-ion, and n is from 4 to 5,000.

In the formulae (I) and (II), it is preferred that each of $R^1$ and $R^2$ represent a hydrogen atom, an alkyl group or a hydroxyalkyl group.

Preferred cationic polymers represented by the formulae (I) and (II) include those in which X is Cl and in which $R^1$ is H and $R^2$ is H, $CH_3$, $C_2H_5$, $CH_2CH_2OH$, $CH_2Ph$, $CH_2CH=CH_2$ or $CH(OH)CH_2Cl$; $R^1$ is $CH_3$ and $R^2$ is $CH_3$, $CH_2CH_2OH$, $CH_2Ph$ or $CH(OH)CH_2Cl$; $R^1$ is $C_2H_5$ and $R^2$ is $C_2H_5$; and $R^1$ is $CH_2CH_2OH$ and $R^2$ is $CH_2CH_2OH$.

Further, the present invention provides a use of the above-mentioned separating membrane of a polyion complex as a separating membrane of a mixture of water and an organic substance which is used in pervaporation or vapor permeation.

Furthermore, the present invention provides a method for separating a mixture of water and an organic substance which comprises reducing the pressure or passing a carrier gas on the secondary side of the above-mentioned separating membrane of a polyion complex while feeding a mixture of water and an organic substance to the primary side of the separating membrane in pervaporation or vapor permeation.

The present invention will now be described in detail.

A preferred example of the cationic polymer having divalent piperidine rings, which is employed to produce the separating membrane of the present invention, is a cationic polymer having divalent piperidinium bases represented by the above general formulae (I) or (II).

In the above general formulae (I) and (II), each of $R^1$ and $R^2$ represents a hydrogen atom or a linear or branched, saturated or unsaturated, aliphatic hydrocarbon group (provided that at least one hydrogen atom of the hydrocarbon group may be substituted with a hydroxyl group, a halogen atom or an aromatic hydrocarbon group).

With respect to the above-mentioned linear or branched, saturated or unsaturated, aliphatic hydrocarbon group, the portion of the hydrocarbon group exclusive of substituents (in the case where at least one hydrogen atom of the aliphatic hydrocarbon group is substituted with an aromatic hydrocarbon group, the portion of the aliphatic hydrocarbon group exclusive of the aromatic hydrocarbon group) have preferably 1 to 6, still preferably 1 to 3 carbon atoms. Linear hydrocarbon groups are preferred to branched ones. Further, the saturated or unsaturated aliphatic hydrocarbon group includes alkyl groups, alkenyl groups and alkynyl groups. Among them, alkyl groups and alkenyl groups are preferred, and alkyl groups are especially preferred. When the aliphatic hydrocarbon group has a substituent, the substituent is generally selected from among a hydroxyl group, a chlorine atom and a phenyl group.

In the above general formulae (I) and (II), X⁻ is a halide counter-ion, which is preferably a chloride ion or a bromide ion, still preferably a chloride ion. Further, in the general formulae (I) and (II), n is in the range of from 4 to 5,000, preferably from 9 to 2,000, still preferably from 15 to 444.

In the present invention, the cationic polymer having divalent piperidine rings may be one having divalent piperidinium bases represented by the following general formula (III):

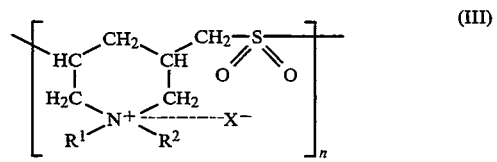

wherein each of $R^1$ and $R^2$ represents a hydrogen atom, an alkyl group or a hydroxyalkyl group, X⁻ represents a halide counter-ion, and n is from 4 to 5,000, provided that the cationic polymer represented by the above general formula (III) includes one having no sulfone bond in its repeating unit.

Particular examples of the cationic polymers each having divalent piperidinium bases include those of the above general formulae (I), (II) and (III) in which $R^1$ is H, $R^2$ is H, $CH_3$, $C_2H_5$, $CH_2CH_2OH$, $CH_2Ph$, $CH_2CH=CH_2$ or $CH(OH)CH_2Cl$ and X is Cl; those in which $R^1$ is $CH_3$, $R^2$ is $CH_3$, $CH_2CH_2OH$, $CH_2Ph$ or $CH(OH)CH_2Cl$ and X is Cl; those in which $R^1$ is $C_2H_5$, $R^2$ is $C_2H_5$ and X is Cl; and those in which $R^1$ is $CH_2CH_2OH$, $R^2$ is $CH_2CH_2OH$ and X is Cl.

Examples of cationic polymers each having divalent piperidine rings other than those represented by the above general formulae (I), (II) and (III) include poly(5-N-(2-trimethylammonium chloride)acetylpiperidylene-3-methylene sulfone), poly(5-N-(2-pyridinium chloride)acetylpiperidylene-3-methylene sulfone) and poly(5-N-(2-carbazolinium chloride)acetylpiperidylene-3-methylene sulfone).

Such cationic polymers each having divalent piperldine rings may be those which are commercially available or have been synthesized specially. They can be freely employed in the present invention, as long as they can form a polyion complex in cooperation with an anionic polymer.

The anionic polymer having carboxyl groups includes anionic homopolymers and copolymers each having, as a constituent monomer, acrylic acid, methacrylic acid or the like. A partial hydrolysate of an acrylonitrile polymer is also included in the category of the anionic polymer having carboxyl groups. That is, the method for introducing a carboxyl group into a polymer includes one in which acrylic acid is (co)-polymerized and another one in which an acrylonitrile polymer is partially hydrolyzed.

In the production of the separating membrane according to the present invention, generally, use is made of a membranous material comprising an anionic polymer having carboxyl groups. The production method of such a membranous material includes (1) a method in which a material (polymer per se or polymer composition) comprising only a polymer obtained by (co)-polymerization of acrylic acid or partial hydrolysis of an acrylonitrile polymer as the polymer component is used to form a membranous material, (2) a method in which a material (polymer per se or polymer composition) comprising only an acrylonitrile polymer as the polymer component is used to form a membrane, followed by partial hydrolysis thereof, (3) a method in which a blend of an acrylic acid polymer and another type of polymer or a composition comprising not only such polymers but also other components is used to form a membranous material, and (4) a method in which a polymer other than an acrylic acid polymer is used to form a membrane, followed by coating of the membrane with an acrylic acid polymer (coating agent) or a composition comprising:an acrylic acid polymer (coating agent composition). However, the production method is not limited to these methods. In the methods (1) and (2), it is easy to produce a highly durable membrane, because a membranous material having carboxyl groups directly and chemically bonded thereto can be obtained. On the other hand, the methods (3) and (4) are characterized in that it is easy to produce a membrane composition suitable for a fluid feed (fluid to be treated), because the use of an acrylic acid polymer in combination with other various components is easy.

In the production of the separating membrane of the present invention, the above-mentioned cationic polymer and the above-mentioned anionic polymer are formed into a polyion complex. The formation of the polyion complex can be generally readily carried out merely by contacting a membranous material comprising an anionic polymer with a solution of a cationic polymer. At that time, the formation of a stable polyion complex is desired from the viewpoint that the resultant separating membrane exhibits improved performance and stability. Accordingly, generally, use is made of a cationic polymer having at least four repeating units. Lower molecular weights are unfavorable because of poor crosslinking effect.

In the separating membrane of the present invention, it is satisfactory for a polyion complex to be formed at least partially on the surface of the separating membrane, and the polyion complex is not necessarily formed all over the surface. With respect to their sectional profiles, most of the separating membranes individually comprise a dense layer positioned on the membrane surface and an adjacent support layer, usually being porous. Thus, it is satisfactory that at least one portion of the dense layer comprises a polyion complex. When the dense layer comprises a polyion complex, excellent separation performance can be exhibited. A dense layer having too large a thickness is unfavorable because the permeation rate of a substance to be treated is low. A separating membrane in which the thickness of the dense layer thereof is 2 μm or less is generally used, and one in which the thickness of the dense layer thereof is 1 μm or less is still preferred.

The formation of the polyion complex is effective not only in improving the hydrophilicity of the separating membrane by the ionization of the carboxyl group, but also in improving the stability of the shape of the membrane by the formation of ionic bonds.

The shape of the separating membrane of the present invention may be any of a flat membrane, a hollow fiber membrane, a tubular membrane and the like, and may be arbitrarily selected depending on the use of the membrane.

When an aqueous solution containing an organic substance in high concentration is separated by pervaporation or vapor permeation with the use of the conventional separating membrane, the permeation rate is extremely low because the partial pressure of water on the primary side of the membrane is small. However, when the separating membrane of the present invention is employed, such an aqueous solution containing an organic substance in high concentration can be concentrated at temperatures as high as 70° C. or above, so that the partial pressure of water on the primary side of the membrane can be readily increased to thereby increase the permeation rate.

EXAMPLE

The present invention will now be described in greater detail with reference to the following Examples, which should not be considered as limiting the invention.

Example 1

A hollow fiber membrane having an inside diameter of 0.5 mm and an outside diameter of 0.8 mm was prepared from an acrylonitrile polymer. The outer surface of the hollow fiber membrane had a number of pore openings with a pore size of about 0.3 μm, while the inner surface thereof had pores with a size of several hundred angstroms (several tens of nanometers).

The membrane was immersed in an aqueous solution containing 0.42N NaOH for 58 min to hydrolyze part of the membrane. Excess alkali present in the membrane was washed off with water to obtain a membranous material. The obtained membranous material and PAS-A-120L (average molecular weight: about 100,000, and the number of repeating units (n): about 440) manufactured by Nitto Boseki Co., Ltd. and having a structure represented by the following formula, as a cationic polymer having divalent piperidinium bases, were formed into a polyion complex:

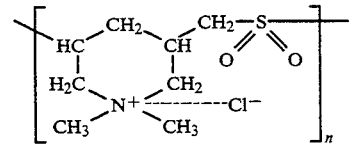

The resultant hollow fiber membrane was observed under an electron microscope, which revealed that a dense layer having a thickness of about from 0.8 to 1 μm was present along the inner surface of the membrane.

Three modules each having a membrane area of 250 cm$^2$ were prepared from this membrane. With respect to each of these modules, the selective permeability for water was evaluated by pervaporation (by reducing the pressure outside the hollow fiber while passing a 99 wt. % aqueous ethanol solution inside the hollow fiber at 70° C.). As a result, all the modules exhibited a permeation rate of 100 g/m$^2$·hr or higher and a separation factor of 1,000 or higher. Further, the temperature of the fluid being evaluated was elevated to its boiling point, and the selective permeability for water was evaluated by vapor permeation. As a result, the permeation rate increased to about 150 g/m$^2$·hr. One of the modules was subjected to a durability test for one month (temperature of fluid feed: 70° C., pervaporation). The permeation rate and the separation factor were 110 g/m$^2$·hr and 1,500, respectively, by which stability was confirmed.

Example 2

A module was prepared in the same manner as that of Example 1, except that the cationic polymer employed was PAS-A-5 (average molecular weight: about 3,500, and the number of repeating units (n): about 15) manufactured by Nitto Boseki Co., Ltd., this being identical in structure with, but different in molecular weight from the one used in Example 1.

The selective permeability for water of this module was evaluated over a period of one month by pervaporation (by reducing the pressure outside the hollow fiber while passing a 99 wt. % aqueous ethanol solution inside the hollow fiber at 70° C.). As a result, the module exhibited a permeation rate of about 70 g/m²·hr and a separation factor of 1,000 or higher, by which stability was confirmed.

Comparative Example 1

A module was prepared in the same manner as that of Example 1, except that the cationic polymer employed was ionene polymer PCA-107 (average molecular weight: about 20,000, and the number of repeating units (n): about 120) having the following structure:

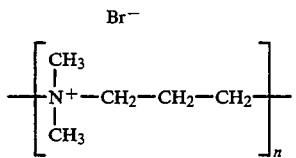

The durability of this module was evaluated by pervaporation at 70° C. in the same manner as that of Example 1. Just after the evaluation was started, the separation factor of the module was as high as 2,000 or above. However, 15 days after the start of the evaluation, it was decreased to 800.

We claim:

1. A separating membrane of a polyion complex characterized in that, in the membranous structure, at least, at least part of the primary side surface of the membrane comprises an ionic combination of an anionic polymer having carboxyl groups with a cationic polymer having divalent piperidine rings.

2. The separating membrane of a polyion complex according to claim 1, wherein said cationic polymer having divatent piperidine rings is a polymer having piperidinium bases represented by the following general formulae (I) or (II):

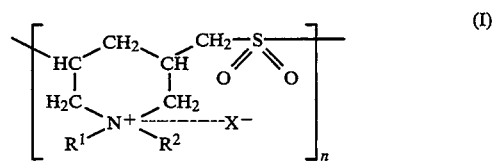

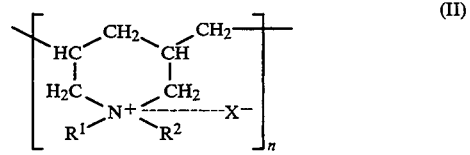

wherein each of $R^1$ and $R^2$ represents a hydrogen atom or a linear or branched, saturated or unsaturated, aliphatic hydrocarbon group (provided that at least one hydrogen atom of the hydrocarbon group may be substituted with a hydroxyl group, a halogen atom or an aromatic hydrocarbon group), $X^-$ represents a halide counter-ion, and n is from 4 to 5,000.

3. The separating membrane of a polyion complex according to claim 1, wherein said carboxyl group is one formed by the hydrolysis of an acrylonitrile polymer.

4. The separating membrane of a polyion complex according to claim 1, wherein said carboxyl group is one derived from an acrylic acid polymer contained in a coating agent or a coating agent composition.

5. The separating membrane of a polyion complex according to claim 1, which has a sectional profile of an asymmetric structure comprising a support layer and a dense layer having a separating function, said dense layer having a thickness of 2 μm or less.

6. A use of the separating membrane of a polyion complex according to claim 1 as a separating membrane for a mixture of water and an organic substance, said membrane being used in pervaporation or vapor permeation.

7. A method for separating a mixture of water and an organic substance which comprises reducing the pressure or passing a carrier gas on the secondary side of the separating membrane of a polyion complex according to claim 1 while feeding a mixture of water and an organic substance to the primary side of the separating membrane in pervaporation or vapor permeation.

* * * * *